United States Patent
Karguth et al.

(10) Patent No.: US 11,449,444 B2
(45) Date of Patent: *Sep. 20, 2022

(54) APPARATUS AND MECHANISM TO BYPASS PCIE ADDRESS TRANSLATION BY USING ALTERNATIVE ROUTING

(71) Applicant: TEXAS INSTRUMENTS INCORPORATED, Dallas, TX (US)

(72) Inventors: Brian Karguth, Van Alstyne, TX (US); Chuck Fuoco, Allen, TX (US); Chunhua Hu, Plano, TX (US); Todd Christopher Hiers, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,154

(22) Filed: Sep. 3, 2019

(65) Prior Publication Data

US 2019/0391941 A1 Dec. 26, 2019

Related U.S. Application Data

(63) Continuation of application No. 15/890,558, filed on Feb. 7, 2018, now Pat. No. 10,402,355.
(Continued)

(51) Int. Cl.
*G06F 13/28* (2006.01)
*G06F 12/1081* (2016.01)
*G06F 13/42* (2006.01)

(52) U.S. Cl.
CPC .......... *G06F 13/28* (2013.01); *G06F 12/1081* (2013.01); *G06F 13/4282* (2013.01); *G06F 2213/0026* (2013.01)

(58) Field of Classification Search
CPC ............. G06F 12/1027; G06F 12/1036; G06F 12/1081; G06F 12/1009; G06F 9/3004;
(Continued)

(56) References Cited

U.S. PATENT DOCUMENTS 8,015,361 B2 * 9/2011 Sathaye ................... G06F 12/10
711/138
9,141,327 B1 * 9/2015 Ugajin ................... G06F 3/1203
(Continued)

OTHER PUBLICATIONS

Extended European Search Report for 18750603.5 dated Apr. 24, 2020.

*Primary Examiner* — Faisal M Zaman
(74) *Attorney, Agent, or Firm* — Brian D. Graham; Charles A. Brill; Frank D. Cimino

(57) ABSTRACT

An address space field is used in conjunction with a normal address field to allow indication of an address space for the particular address value. In one instance, one address space value is used to indicate the bypassing of the address translation used between address spaces. A different address space value is designated for conventional operation, where address translations are performed. Other address space values are used to designate different transformations of the address values or the data. This technique provides a simplified format for handling address values and the like between different devices having different address spaces, simplifying overall computer system design and operation.

20 Claims, 4 Drawing Sheets

Related U.S. Application Data

(60) Provisional application No. 62/456,162, filed on Feb. 8, 2017.

(58) Field of Classification Search
CPC ...... G06F 12/0888; G06F 12/10; G06F 13/28; G06F 13/4282; G06F 2213/0026
USPC ................ 711/206, 207, 202, E12.001, 203, 711/E12.058; 710/22, 20
See application file for complete search history.

(56) References Cited

U.S. PATENT DOCUMENTS

| | | | |
|---|---|---|---|
| 10,402,355 B2* | 9/2019 | Karguth | G06F 13/28 |
| 2005/0129066 A1* | 6/2005 | Tischer | H04L 12/5601 |
| | | | 370/476 |
| 2005/0144420 A1 | 6/2005 | Michimoto et al. | |
| 2007/0198804 A1* | 8/2007 | Moyer | G06F 12/1027 |
| | | | 711/202 |
| 2008/0126607 A1* | 5/2008 | Carr | H04L 47/10 |
| | | | 710/29 |
| 2010/0131805 A1 | 5/2010 | Katsuragi | |
| 2011/0047353 A1 | 2/2011 | Matsuno | |
| 2011/0066797 A1 | 3/2011 | Kawazu | |
| 2011/0231624 A1 | 9/2011 | Fukutomi et al. | |
| 2011/0271075 A1* | 11/2011 | Ahn | G06F 12/1081 |
| | | | 711/206 |
| 2012/0260009 A1* | 10/2012 | Lu | G06F 3/0679 |
| | | | 710/52 |
| 2013/0080854 A1* | 3/2013 | Nicholas | G06F 11/1076 |
| | | | 714/758 |
| 2013/0111185 A1* | 5/2013 | Driever | G06F 12/0246 |
| | | | 711/213 |
| 2013/0166874 A1 | 6/2013 | Auernhammer et al. | |
| 2013/0282933 A1 | 10/2013 | Jokinen et al. | |
| 2014/0208064 A1* | 7/2014 | Basu | G06F 12/10 |
| | | | 711/207 |
| 2014/0281361 A1 | 9/2014 | Park et al. | |
| 2014/0281432 A1* | 9/2014 | Anderson | G06F 9/384 |
| | | | 712/226 |
| 2014/0310430 A1 | 10/2014 | Geddes et al. | |
| 2014/0354667 A1 | 12/2014 | Lin et al. | |
| 2015/0138900 A1 | 5/2015 | Choi | |
| 2015/0205719 A1* | 7/2015 | Murakami | G06F 12/0246 |
| | | | 711/103 |
| 2015/0020481 A1 | 8/2015 | Tanimoto | |
| 2015/0227313 A1* | 8/2015 | Lee | G06F 12/1009 |
| | | | 711/103 |
| 2016/0062911 A1 | 3/2016 | Kegel et al. | |
| 2016/0124891 A1 | 5/2016 | Ahmad et al. | |
| 2016/0350225 A1 | 12/2016 | Podaima et al. | |
| 2017/0075816 A1* | 3/2017 | Okada | G06F 3/0647 |
| 2017/0075937 A1 | 3/2017 | Moehler et al. | |
| 2017/0212837 A1* | 7/2017 | Breternitz | G06F 3/0611 |
| 2017/0277634 A1 | 9/2017 | Basu et al. | |
| 2017/0277639 A1 | 9/2017 | Awad et al. | |
| 2018/0011651 A1 | 1/2018 | Sankaran et al. | |
| 2018/0107604 A1 | 4/2018 | Dooley et al. | |
| 2018/0136871 A1* | 5/2018 | Leidel | G06F 3/061 |

* cited by examiner

APPARATUS AND MECHANISM TO BYPASS PCIE ADDRESS TRANSLATION BY USING ALTERNATIVE ROUTING

CROSS REFERENCE TO RELATED APPLICATIONS

This application is a continuation of U.S. patent application Ser. No. 15/580,558, filed Feb. 7, 2018, which claims the benefit under 35 U.S.C. § 119(e) of U.S. Provisional Patent Application Ser. No. 62/456,162, filed Feb. 8, 2017, titled "Apparatus and Mechanism to Bypass PCIE Address Translation By Using Alternative Routing", all of which are hereby incorporated by reference as if reproduced in their entireties.

BACKGROUND

1. Field

The field relates to transfers of information between various address spaces.

2. Description of the Related Art

Modern computers are extremely sophisticated, complicated and powerful. To improve the processing capabilities, many modern computers include intelligent input output (I/O) devices. These intelligent I/O devices often include a system-on-a-chip, which includes a microprocessor and has a connected memory. Of course, the computer includes its own main microprocessor and memory. The presence of multiple microprocessors often creates a situation of disparate address spaces between the various microprocessors. The intelligent I/O devices are often connected to the computer using advanced interfaces, such as Peripheral Component Interconnect Express (PCIe). PCIe includes its own address space, which is in addition to the address spaces of the various microprocessors. The existence of these plurality of address spaces in the past has required address translations at each step and in each direction. The many address translations complicated overall computer system design, often unnecessarily.

SUMMARY

An address space field is used in conjunction with the normal address field to allow indication of an address space for the particular address value. In one instance, one address space value is used to indicate the bypassing of the address translation used between address spaces. A different address space value is designated for conventional operation, where address translations are performed. Other address space values are used to designate different transformations of the address values or the data. This technique provides a simplified format for handling address values and the like between different devices having different address spaces, simplifying overall computer system design and operation.

BRIEF DESCRIPTION OF THE FIGURES

For a detailed description of various examples, reference will now be made to the accompanying drawings in which.

DETAILED DESCRIPTION

Figure 1:
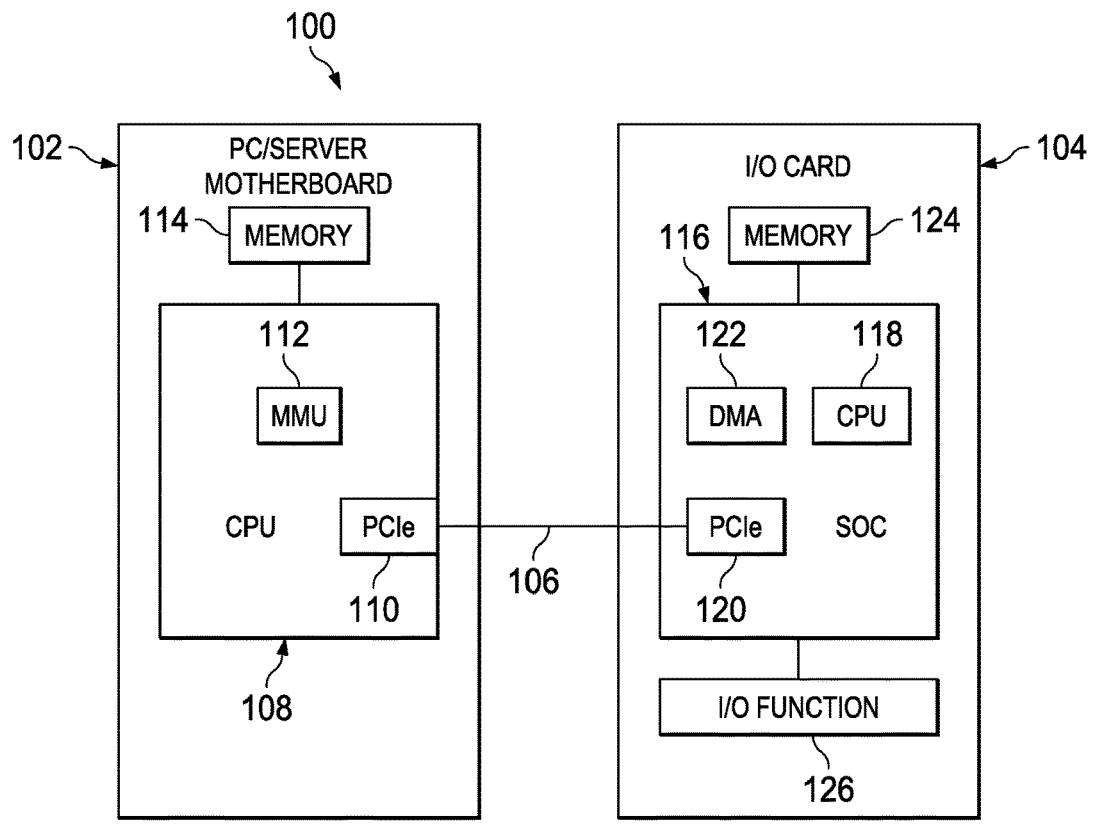
FIG. 1 is a block diagram of an example computer system.

Referring now to FIG. 1, an example computer system 100 is illustrated. A PC or server mainboard or motherboard 102 is connected to an I/O card 104 using a PCIe link 106. The motherboard 102 includes a microprocessor 108 that includes an embedded PCIe root port 110 and a memory management unit (MMU) 112. Main memory 114 is connected to the microprocessor 108 and cooperates with the MMU 112. The MMU 112 provides the virtual address to physical address translations necessary for normal operation, where the computer system microprocessor 108 is operating in a virtual address space and needs to access the physical memory 114.

The I/O card 104 includes a semiconductor device that is a system on a chip (SOC) 116. The SOC 116 includes a microprocessor 118, which may include an MMU 119 (FIG. 3) and various integrated functions. A PCIe port 120 is used to connect to the motherboard 102. A direct memory access (DMA) controller 122 is used to control transfer of data between I/O card memory 124 and an I/O function 126. Exemplary I/O functions include disk array controllers, advanced network cards and the like. The DMA controller 122 handles transferring data between the I/O function 126 and memory 124 and between the memory 124 and the main memory 114 on the motherboard 102.

Figure 2:
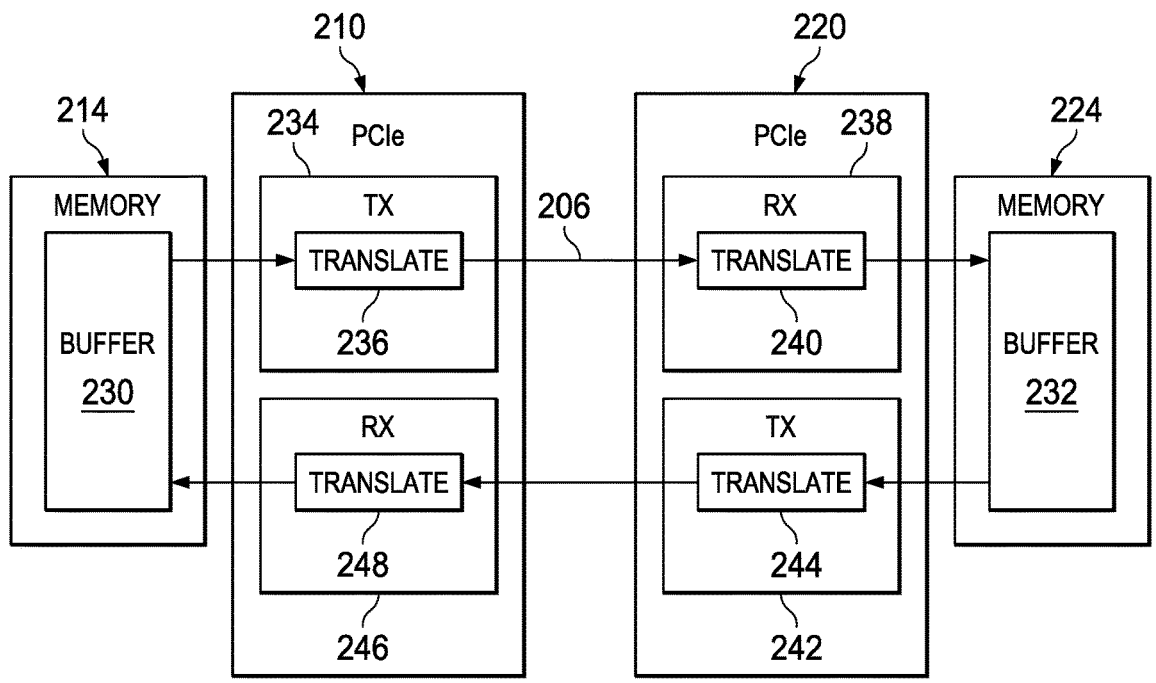
FIG. 2 is a block diagram illustrating address translations according to the prior art.

Referring now to FIG. 2, a block diagram illustrating the data transfers and address translations according to the prior art over a PCIe link are illustrated. A memory 214, similar to the memory 114 on the motherboard 102, contains a buffer 230 which contains data that is to be transferred to a buffer 232 in a memory 224, which is similar to memory 124. The data is to be moved from the buffer 230 over the PCIe link 206. The data is provided from the buffer 230 to a PCIe root port 210. A transmitter (TX) section 234 of the PCIe root port 210 receives the data and a translate block 236 translates the address from the physical address of the memory 214 to a PCIe address. The data is transmitted to an endpoint PCIe port 220, which is similar to the PCIe port 120. The data is received at a receive block 238, where a translate block 240 translates the address from the PCIe address to the physical address of the memory 224. The data is then placed in the buffer 232.

If the data is to be transferred from the buffer 232 to the buffer 230, then the data is retrieved from the buffer 232 and provided to a transmit block 242 in the PCIe port 220. The transmit block 242 includes a translate block 244 to translate from the physical memory address used with memory 224 to the PCIe address. The data is received at a receive block 246 in the PCIe root port 210. A translate block 248 translates the address from the PCIe address to the physical address of the memory 214 and then the data is deposited in the buffer 230.

As can be seen, multiple address translations are required even though the processors on each device are highly sophisticated and can manage very complicated memory maps. One difficulty is the need to program each of the particular translations into the various translate blocks. On the PCIe receive side, this is done through base address registers (BARs), of which there are a limited number and must be programmed or reprogrammed as needed. On the PCIe transmit side, the direct address translations are programmed or reprogrammed as necessary.

Figure 3:
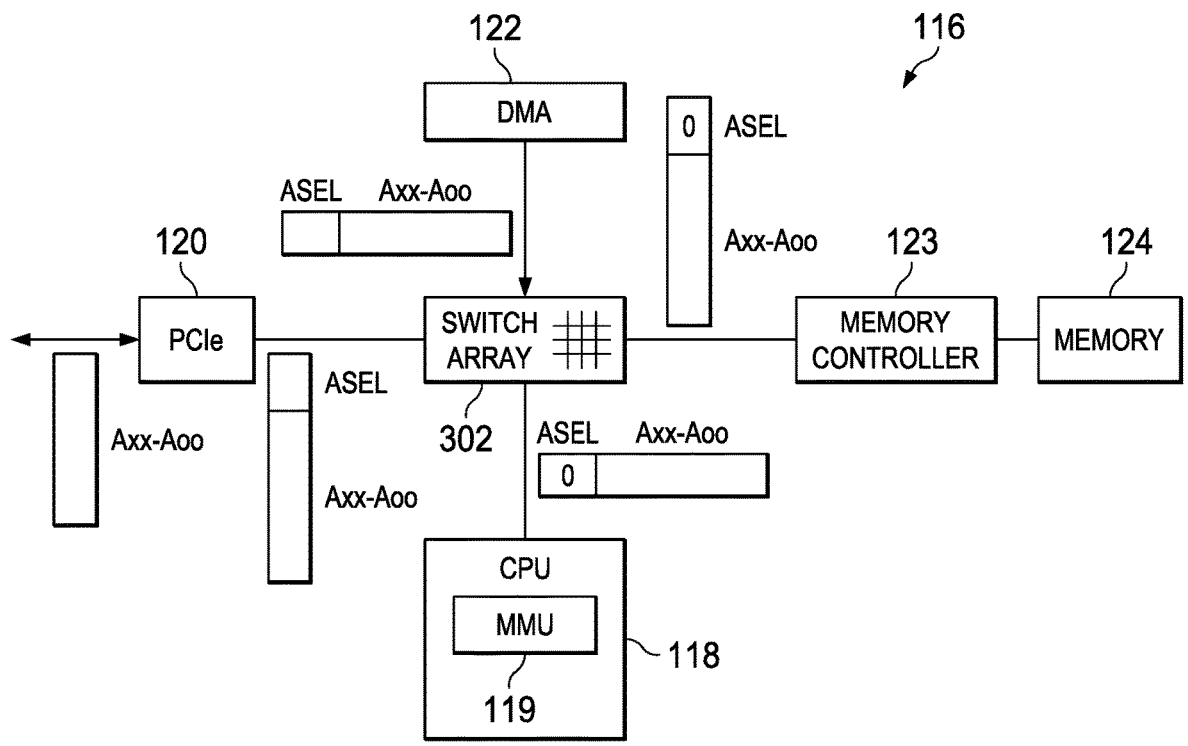
FIG. 3 is a block diagram of an example system on a chip using address space values.

Referring now to FIG. 3, a detailed block diagram of the SOC 116 is provided. The microprocessor 118, a memory controller 123 connected to the memory 124, the DMA controller 122 and the PCIe port 120 are interconnected by a crossbar or switch array 302. An address format is provided for each of the connections to the switch array 302. The address format is divided into two portions, a pre-pended address space value or ASEL portion and a basic memory address portion, such as a Axx-A00, for example A31-A00 or A63-A00. The switch array 302 is designed to handle the pre-pended address space value bits in addition to the normal address bits, as well as the normal data and control bits. In the illustrated example, an ASEL bit for the memory controller 123 and the microprocessor 118 is zero, which is used to indicate conventional operation. The PCIe port 120 and DMA controller 122 can set the ASEL bit as desired to indicate conventional operation or operation in a secondary address space. By setting the ASEL bit to a one value, operation in the secondary address space is indicated. The address value used on the PCIe link is the normal PCIe address value without any address space value selection bits.

In operation, the DMA controller 122 is programmed for a particular data transfer. As an example, for a transfer of data from a buffer in the memory 124 to the PCIe port 120, the DMA controller 122 is programmed to provide an ASEL value of zero when reading the data from the memory 124 and is programmed to use an ASEL value of one when writing the data to the PCIe port 120 if no address translation is to be performed. If address translation is to be performed, then the DMA controller 122 is programmed to use an ASEL value of zero on the write operation. If the microprocessor 118 is operating directly with the PCIe port 120, then an ASEL value of zero is used as in the example the microprocessor 118 only provides memory operations using a zero ASEL value. In that instance, the PCIe port 120 performs address translations as normally done.

Figure 4:
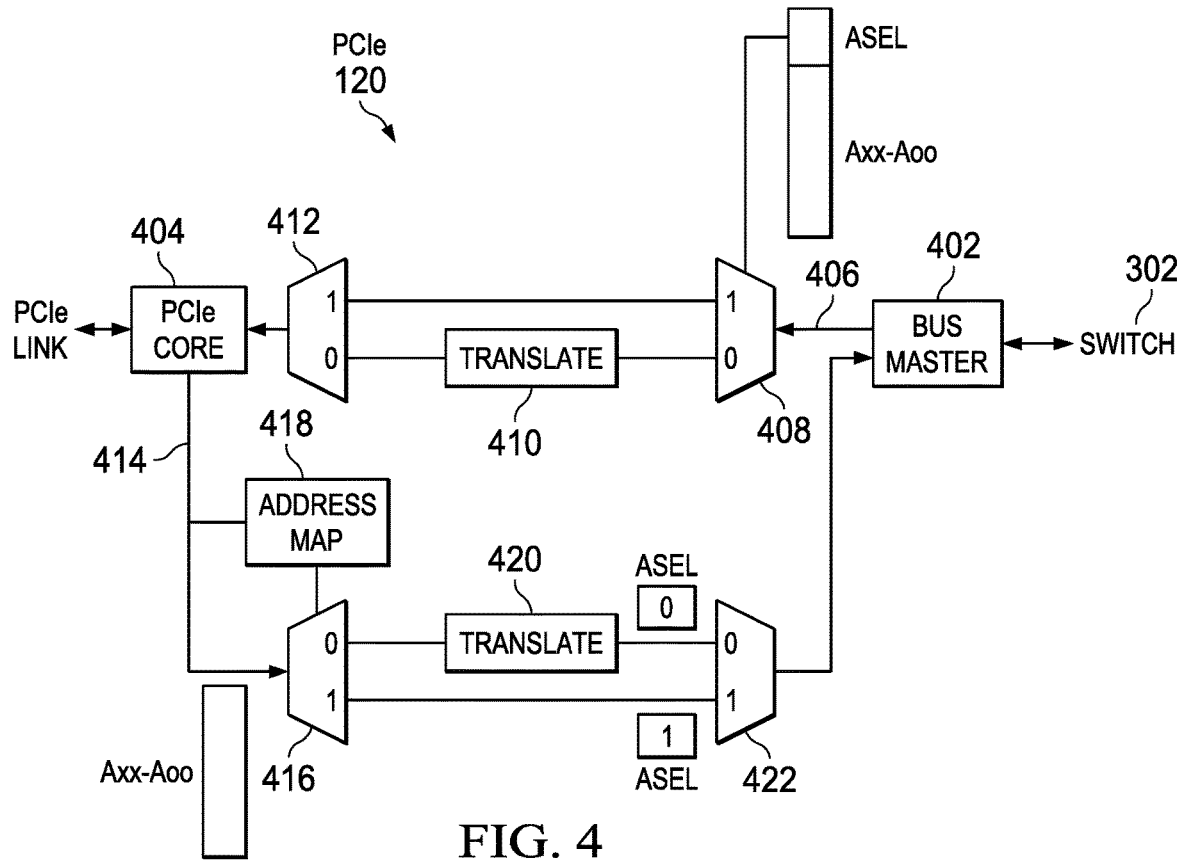
FIG. 4 is a block diagram of a PCIe port of the system on a chip of FIG. 3.

Referring now to FIG. 4, details of the PCIe port 120 are provided. A bus master module 402 is provided to connect to the switch array 302. A PCIe core 404 is provided to develop the PCIe link, such as to the motherboard 102. A transmit address path 406 from the bus master module 402 is provided to the input of a 2 bit demultiplexer 408. The selection output of the demultiplexer 408 is provided by the ASEL bit in the address provided over the transmit address path 406. The zero or normal address space value output of the demultiplexer 408 is provided to a translate block 410, which translates the memory 124 physical addresses to PCIe addresses as in the prior art. The output of the translate block 410 is provided as the zero input to a multiplexer 412. The output of the multiplexer 412 is provided to the PCIe core 404 as the transmit address. The one or alternate address space value output of the demultiplexer 408 is provided directly to the one input of the multiplexer 412. By this direct connection, no address translations are performed on the address in the particular transaction. The ASEL bit is stripped off or removed by either the multiplexer 412 or the PCIe core 404.

In the illustrated example, a receive (RX) address path 414 is provided from the PCIe core 404 to the input of a demultiplexer 416. The output control of the demultiplexer 416 is provided by an address map block 418 which examines the address bits, such as Axx-A00, of the transaction and appropriately determines whether the addresses need to be translated or can be used in an untranslated format. If translation is required, the zero output from the demultiplexer 416 is provided to a translate block 420, which performs the necessary address translation. The output of the translate block 420 is provided to a zero input of a multiplexer 422, with a zero value ASEL bit pre-pended to the address. The output of the multiplexer 422 is provided as the receive address to the bus master module 402.

If no address translation is required, the one output of the demultiplexer 416 provides the address directly to the one input of the multiplexer 422, with a one value provided as the pre-pended ASEL bit. By providing the ASEL bit at the multiplexer 422, the internal routing inside the SOC 116 can be done using the ASEL bit as illustrated in FIG. 3.

In another example, the untranslated or bypass path is not present in the receive path and address translations based on the base address registers (BARs) are performed. In this example the demultiplexer 416, multiplexer 422 and address map 418 used with the demultiplexer 416 are not present and an ASEL value of zero is always used.

Figure 5:
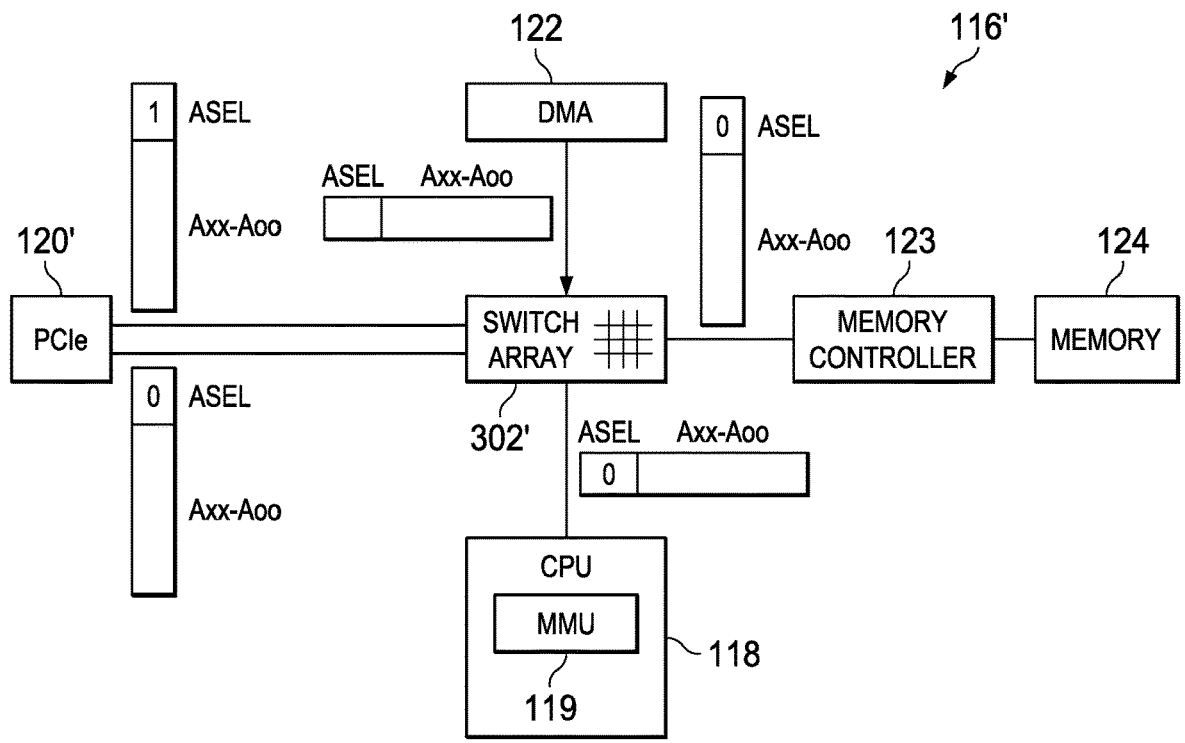
FIG. 5 is a block diagram of a second example system on a chip using address space values.

FIG. 5 provides a second example of an SOC 116'. Like components with the SOC 116 of FIG. 3 are numbered the same. The difference in the case of FIG. 5 is that an alternate switch array 302' is provided which has separate connections to a PCIe port 120' for address values with an ASEL value of zero and an ASEL value of one. In this example the PCIe port 120' does not need to do the demultiplexing with the demultiplexer 408 or multiplexing using the multiplexer 422 but rather the paths are provided directly to the two connections of the switch array 302'. The switch array 302' uses the ASEL bit as an additional routing term when routing messages. Thus, effectively the PCIe port 120' has two connections into the switch array 302' rather than the single connection as illustrated in FIGS. 3 and 4.

Figure 6:
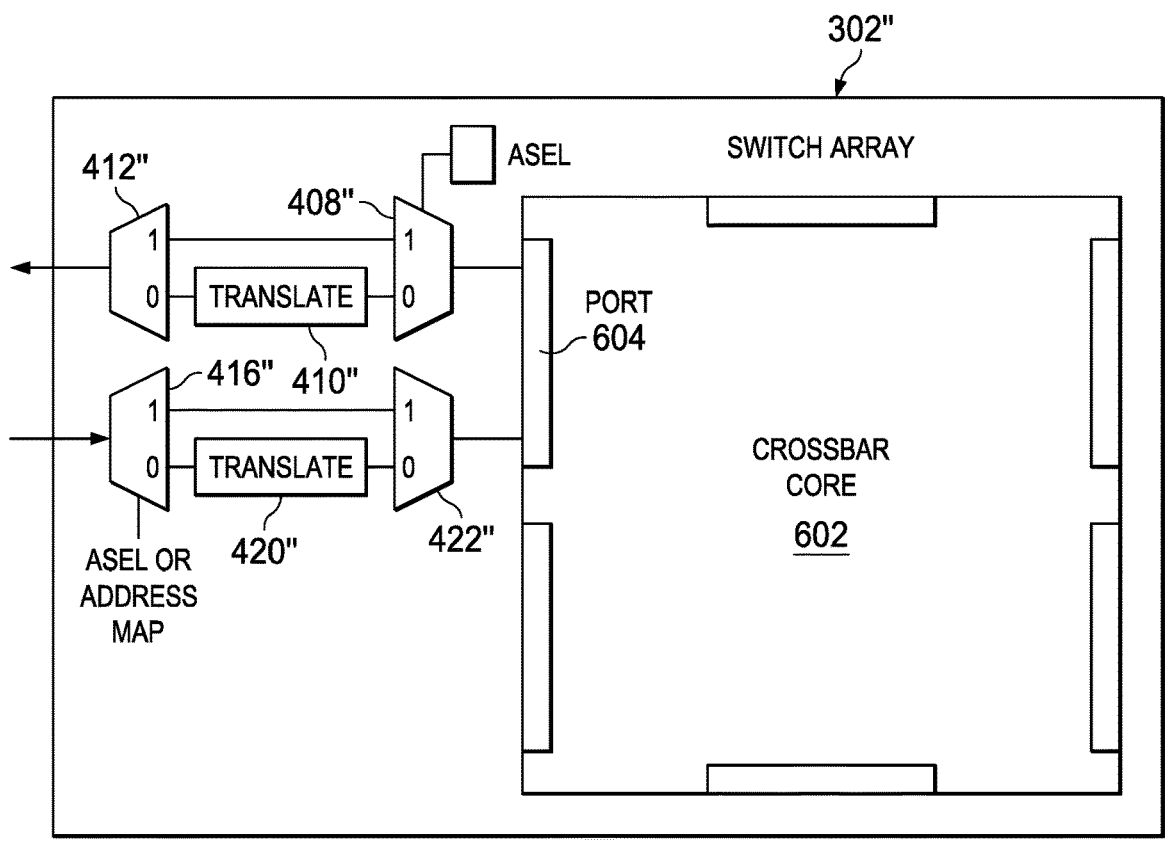
FIG. 6 is a block diagram of a switch in the second example system on a chip.

Referring now to FIG. 6, a switch array 302" is provided. In the switch array 302", the multiplexer, demultiplexer and translate blocks that were illustrated in FIG. 4 have been moved into the switch array 302. The switch array 302" includes a crossbar core 602, which is effectively the switch array 302. One port 604 includes the multiplexer, demultiplexer and translation logic as present in FIG. 4. Like element numbers from FIG. 4 are provided in FIG. 6 with the addition of a double prime to indicate this example use in the switch array 302". By integrating the multiplexer, translation and demultiplexer elements into the switch array 302", conventional PCIe port logic that does not include the multiplexer, demultiplexer and translate elements can be utilized. As the above examples are integrated onto an SOC, the location of these elements is thus a design choice as functionally they are equivalent.

The above description uses a single ASEL bit to simplify the description. In another example shown in FIG. 7, the address space value indication is provided by a four bit ASEL field. Instead of the two address space values as done using a single ASEL bit, use of four bits provides up to 16 separate address space value indications. The bus master module 702 provides the address values to the input of a 16 output address demultiplexer 704. The four ASEL bits are utilized to select the desired output of the address demultiplexer 704. As in the prior example, an ASEL value of zero is utilized to provide address values to a translate block 0 706, which provides prior art type address translation. The ASEL one output is provided directly to an address multiplexer 708 without any translation as illustrated in FIG. 4. As illustrated, an ASEL value of 2 directs the output of the address demultiplexer 704 to an address translate block 2 710, which can be bypassed by a switch 712. The selection of the translate block 2 710 or bypassing switch 712 is performed by a configuration register bit to allow selective translation or bypassing of address translation. The output of the address translate block 2 710 and bypass switch 712 is provided to the address multiplexer 708. Similar address translation blocks and bypass switches are provided at the remaining outputs of the address demultiplexer 704 up to an output representing the value F or 15, whose output is provided to an address translation block F 714 and a bypass 716. The outputs of the address translation blocks 2 to F and related bypass switches are provided to respective inputs of the address multiplexer 708.

Figure 7:
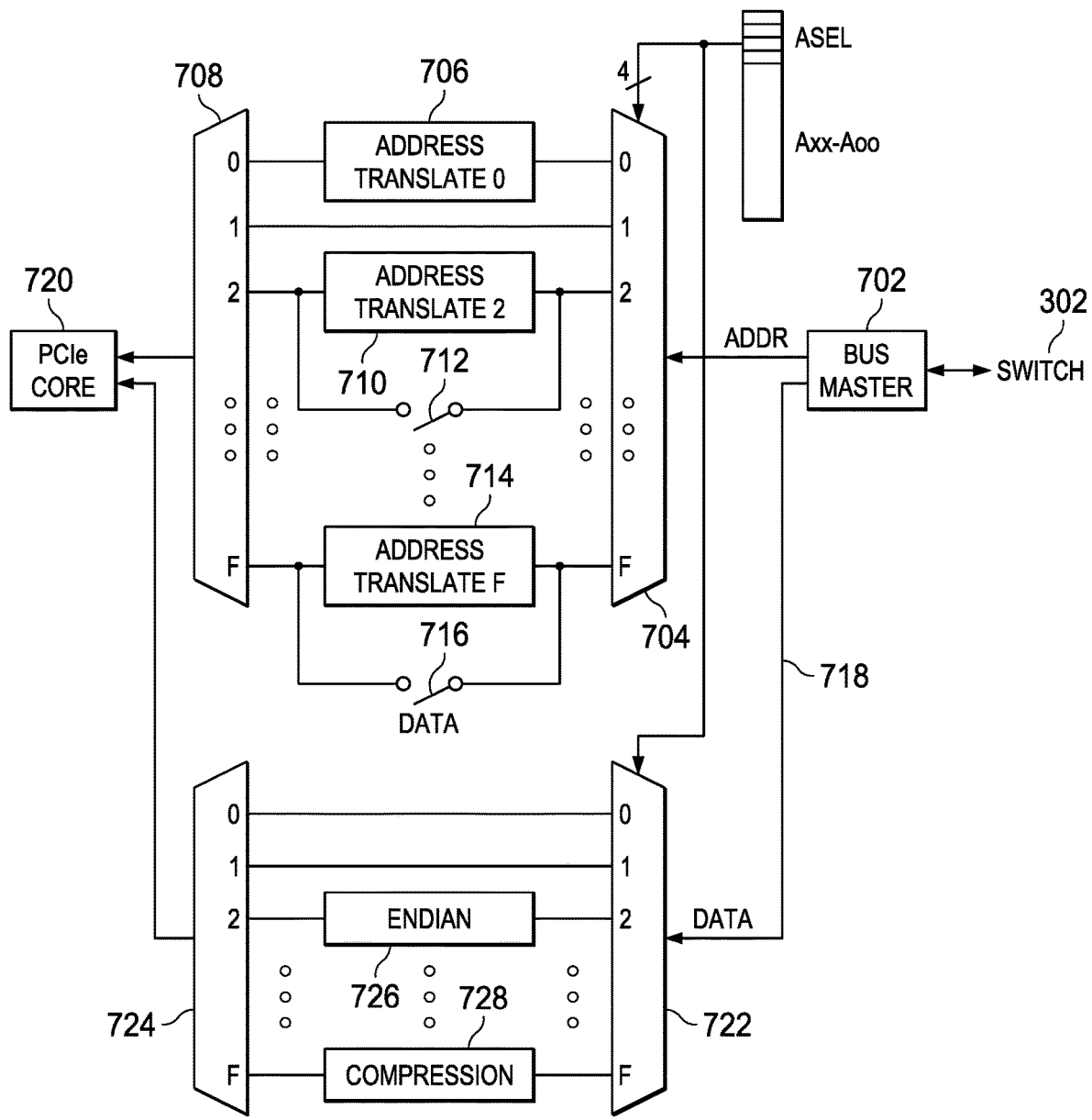
FIG. 7 is a detailed block diagram of the transmit portion of a PCIe port with a plurality of address spaces.

Data paths were not illustrated in FIG. 4 as the data path was straight through, with no data manipulations. In FIG. 7, data path manipulations are provided. A data path 718 is provided from the bus master module 702 to the input of a 16 output data demultiplexer 722. The selection of the data demultiplexer 722 is provided by the ASEL bits. Thus the outputs of the address demultiplexer 704 and the data demultiplexer 722 are matched so that the steering of the address and data values are done based on the same ASEL value. In the illustrated example, the zero and one outputs from the data demultiplexer 722 go directly to the zero and one inputs of a data multiplexer 724, whose output is the data path to a PCIe core 720. The two output of the data demultiplexer 722 is provided to an endian reversal block 726 to allow conversion between big endian and little endian systems. Noting that the two output path through the data demultiplexer 722 to the endian reversal block 726 to the data multiplexer 724 parallels the address translate block 2 710 or bypass switch 712, address translations can be used if desired in addition to the data endian conversion or address translation can be omitted while endian conversions are performed. The illustrated example F or 15 output of the data demultiplexer 722 is provided to a compression block 728 whose output goes to the F or 15 input of the data multiplexer 724. As with the endian conversion, the address path allows for address translations or direct untranslated addresses depending upon the particular design requirements. Various desired data manipulations can be selected using other outputs as desired. The endian reversal and compression data conversions are illustrative and not exhaustive.

While FIG. 7 does not show the receive path for the address or data, the receive path is configured similarly to the address receive path shown in FIG. 4 except for the inclusion of the data path operations and the 16 alternative address spaces rather than just two.

The above description has focused on an endpoint PCIe port configuration. It is understood that the use of the additional bits to provide address space value indications which are used to indicate different functions can be used in a PCIe root port configuration as well.

The above description has described the ASEL bits as pre-pended to the normal address bits. The pre-pending is done for illustrative purposes. It is understood that the ASEL bits can be post-pended or can be provided in a side channel if desired.

While configuration and operation is described using a PCIe port as exemplary, it is understood that selections based on address space value bits can be done for many different functions, functions that need some processing of address or data values between the source and destination. As one example, inclusion in and operation with a Hyper-Transport interface is similar to the exemplary PCIe port.

Other address translation examples include various remote DMA (RDMA) protocols. Endian conversion and compression were described as data operations but other data operations can also be done, such as encryption and the like.

It is understood that different ports or functional blocks can use different address and data transformations in the same system. For example, address translation bypassing can be used with a PCIe port and data encryption can be used with a disk array function by assigning each operation to a different address space, such as zero for normal PCIe port and serial attached SCSI (SAS) port operation, one for PCIe port address translation bypassing and two for SAS port data encryption. In such a case, the multiplexers and demultiplexers at each port do not need to be complete, that is include all outputs or inputs for the number of address space value selection bits, but can only decode for address space values relevant to the particular function, with any other address space value at that port generating an error condition.

While the above description has focused on configurations and operation internal to an SOC, it is understood that the configurations and operation apply equally to external connections.

While only the DMA controller and the PCIe port have been described as providing and using different ASEL bit values in their operations, it is understood that any other device can use address space values if desired. For example, the MMU in the processor can be extended to add ASEL bits to its operation to allow the processor to perform address space indication as well.

By providing address space value selection bits in addition to normal address bits, different functionalities for the different address spaces can be specified, allowing improved operation of the resulting computer.

The above description is intended to be illustrative, and not restrictive. For example, the above-described examples may be used in combination with each other. Many other examples will be upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
   receiving a transaction that includes a first set of data and address information that includes a first address and an address space value, wherein the address space value is not a portion of the first address;
   determining, based on the address space value, whether to translate the first address to produce a second address or to provide the first address as the second address;
   determining, based on the address space value, whether to perform a first operation or a second operation on the first set of data to produce a second set of data, wherein the first operation and the second operation are different; and
   providing the second address and the second set of data over a Peripheral Component Interconnect Express (PCIe) bus.

2. The method of claim 1, wherein the determining of whether to translate the first address to produce the second address includes determining, based on the address space value, whether to apply a first type of address translation operation that translates the first address to a first address space or to apply a second type of address translation operation that translates the first address to a second address space, wherein the first type of address translation operation and the second type of address translation operation are different.

3. The method of claim 1, wherein:
the first operation is a data manipulation operation; and
the second operation is a data manipulation bypass operation.

4. The method of claim 1, wherein:
the first operation is a first type of data manipulation operation; and
the second operation is a second type of data manipulation operation.

5. The method of claim 4, wherein:
the first type of data manipulation operation is an endian reversal operation; and
the second type of data manipulation operation is a data compression operation.

6. The method of claim 1, wherein receiving the transaction is performed by using an input/output port of a computing system.

7. The method of claim 6, wherein the input/output port is a Peripheral Component Interconnect Express (PCIe) port.

8. A system comprising:
a first device; and
a peripheral device coupled to the first device that includes:
an input/output (I/O) port to receive a transaction originating from the first device, wherein the transaction includes a first set of data and address information that includes a first address and an address space value, wherein the address space value is not a portion of the first address;
an address path that includes:
address translation circuitry coupled to receive the first address and to provide a second address; and
a bypass path coupled to receive the first address and to provide the first address as a third address; and
a data path that includes:
a first set of circuitry configured to perform a first operation on the first set of data to produce a second set of data; and
a second set of circuitry configured to perform a second operation on the first set of data to produce a third set of data;
wherein the address path is configured to provide either the second address or the third address based on the address space value is a first value; and
wherein the data path is configured to provide either the second set of data or the third set of data based on the address space value; and
a Peripheral Component Interconnect Express (PCIe) circuit coupled to the address path and the data path and configured to provide the provided one of the second address or the third address and the provided one of the second set of data or the third set of data over a PCIe bus.

9. The system of claim 8, wherein the first device is a processor.

10. The system of claim 8, wherein the first device is a direct memory access (DMA) controller.

11. The system of claim 8, wherein the address space value is indicated by a plurality of bits.

12. The system of claim 8, wherein:
the address translation circuitry is a first set of address translation circuitry and is configured to perform a first type of address translation operation that translates the first address to a first address space; and
the address path further includes a second set of address translation circuitry that is configured to perform a second type of address translation that translates the first address to a second address space.

13. The system of claim 8, wherein:
the first operation is a data manipulation operation; and
the second operation is a data manipulation bypass operation.

14. The system of claim 8, wherein:
the first operation is a first type of data manipulation operation; and
the second operation is a second type of data manipulation operation.

15. The system of claim 14, wherein:
the first type of data manipulation operation is an endian reversal operation; and
the second type of data manipulation operation is a data compression operation.

16. The method of claim 1, wherein the providing of the second address and the second set of data over the PCIe bus does not include providing the address space value.

17. The method of claim 1, wherein the transaction is received from at least one of: a Direct Memory Access (DMA) controller, a memory controller, or a processor.

18. The system of claim 8, wherein the address path includes a demultiplexer coupled to receive the first address and configured to provide the first address to either the address translation circuitry or the bypass path based on the address space value.

19. The system of claim 8, wherein the address path includes a multiplexer coupled to the address translation circuitry and the bypass path and configured to provide either the second set of data or the third set of data.

20. The system of claim 8, wherein the PCIe circuit is configured to provide the provided one of the second address or the third address and the provided one of the second set of data or the third set of data without the address space value over the PCIe bus.

* * * * *